United States Patent [19]

Thompson

[11] Patent Number: 4,503,490
[45] Date of Patent: Mar. 5, 1985

[54] DISTRIBUTED TIMING SYSTEM

[75] Inventor: John S. Thompson, Tinton Falls, N.J.

[73] Assignee: AT&T Bell Laboratories, Murray Hill, N.J.

[21] Appl. No.: 272,300

[22] Filed: Jun. 10, 1981

[51] Int. Cl.³ .............................................. G06F 1/04
[52] U.S. Cl. ................... 364/200; 375/106; 371/61; 365/233
[58] Field of Search ... 364/200 MS File, 900 MS File; 375/106; 371/61; 365/233; 328/63; 307/480

[56] References Cited

U.S. PATENT DOCUMENTS

| | | | |
|---|---|---|---|
| 3,443,070 | 5/1969 | Derby et al. | 328/63 |
| 3,715,729 | 2/1973 | Mercy | 364/200 |
| 3,761,884 | 9/1973 | Arsan et al. | 364/200 |
| 3,774,157 | 11/1973 | Tsui | 364/200 |
| 3,919,695 | 11/1975 | Gooding | 364/200 |
| 3,932,847 | 1/1976 | Smith | 364/200 |
| 4,050,096 | 9/1977 | Bennett et al. | 364/200 |
| 4,063,308 | 12/1977 | Collins et al. | 364/200 |
| 4,099,241 | 7/1978 | Ossfeldt | 364/200 |
| 4,104,720 | 8/1978 | Gruner | 364/200 |
| 4,368,514 | 1/1983 | Persaud | 364/200 |
| 4,419,739 | 12/1983 | Blum | 364/900 |

OTHER PUBLICATIONS

*AFIPS Conf. Proc.*, vol. 27, Part 1, 1965 Fall Joint Comptr. Confr. "Circuit Implementation of High-Speed Pipeline Systems", pp. 489-504.
*ISSCC* '80-Digest of Tech. Papers., Feb. 13, 1980, "A Digital Signal Processor for Telecommunications Applications," pp. 44-45.
*ICASSP* '80-Proceedings, vol. 1 of 3, Apr. 9, 1980, "An LSI Digital Signal Processor", pp. 383-385.
*ICC* '80 Confr. Record, vol. 1 of 3, Jun. 1980, "An Integrated Circuit Digital Signal Processor", pp. 11.1.1-11.1.5.
*ICCC* '80 *Proceedings*, vol. 2 of 2, Oct. 1, 1980, "Logic and Fault Simulations of the DSP, a VLSI Dig. Signal Processor," pp. 948-952.

*Primary Examiner*—Eddie P. Chan
*Attorney, Agent, or Firm*—Richard B. Havill

[57] ABSTRACT

A timing system, for distributing clock signals in a synchronous processing system having plural processing sections, includes a central clock circuit and a plurality of section clock circuits, each section clock circuit being located in and associated with a different one of the processing sections. Each section clock circuit is arranged to respond to a system clock signal for stepping through a plurality of states including a state common to the plurality of section clock circuits. An arrangement, responsive to the system clock signal, produces and transmits to the plurality of section clock circuits a synchronization signal that routinely sets the plurality of section clock circuits to the common state. The timing system may further include an arrangement for controlling suspension of processing in the plural processing sections.

4 Claims, 8 Drawing Figures

DISTRIBUTED TIMING SYSTEM

BACKGROUND OF THE INVENTION

This invention relates to a timing system that is more particularly described as a timing system for distributing clock signals in a processing system having plural processing sections.

In the prior art, operation of a synchronous system is timed by a signal from a central clock. When some particular operation requires timing that is different than the central clock signal timing, another clock signal is derived at the central location from the central clock signal. To accommodate a large plurality of different particular operations which can occur in a synchronous system, many different clock signals are derived at the central location from the central clock signal. Typically all of these many clock signals are transmitted to all of the processing sections of the system by way of as many different clock leads as there are different clock signals.

A problem arises when a synchronous system includes many circuits in a small area such as in a very large scale integrated (VLSI) circuit. It is desirable to supply all of the needed clock signals to all of the processing sections of the integrated circuit chip while utilizing a minimum of chip area for distributing the many different clock signals. The problem is that the many clock leads occupy too much of the total area available for circuitry.

SUMMARY OF THE INVENTION

This problem is solved by a timing system for distributing clock signals in a synchronous processing system having plural processing sections, the timing system includes a central clock circuit for providing a continuous sequence of system clock signals, a plurality of section clock circuits located in different ones of the processing sections, and means for transmitting the continuous sequence of system clock signals to the section clock circuits as section master clock signals. Each section clock circuit is arranged to respond to the section master clock signals applied thereto for stepping through a plurality of states including a state common to the plurality of section clock circuits. In response to the plurality of states, each section clock circuit generates section clock signals for its associated processing section. An arrangement, repeatedly responsive to the continuous sequence of system clock signals, produces and transmits to the plurality of section clock circuits synchronization signal that routinely set the plurality of section clock circuits to the common state.

BRIEF DESCRIPTION OF THE DRAWINGS

A better understanding of the invention may be derived by reading the following detailed description of an illustrative embodiment thereof with reference to the attached drawings wherein.

DETAILED DESCRIPTION

Figure 1:
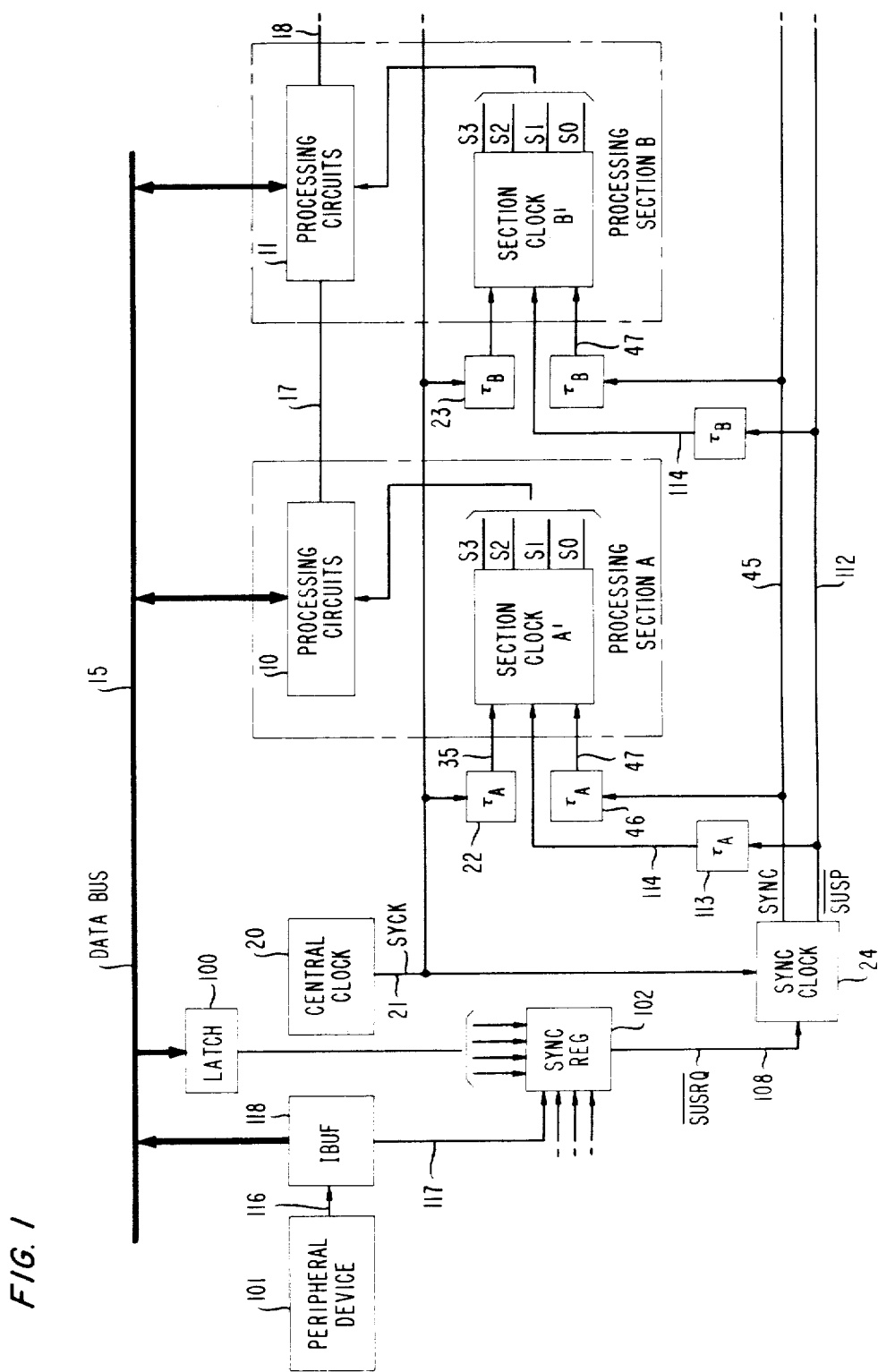
FIG. 1 is a block diagram of an illustrative timing system arranged in accordance with the invention.
Figure 6:
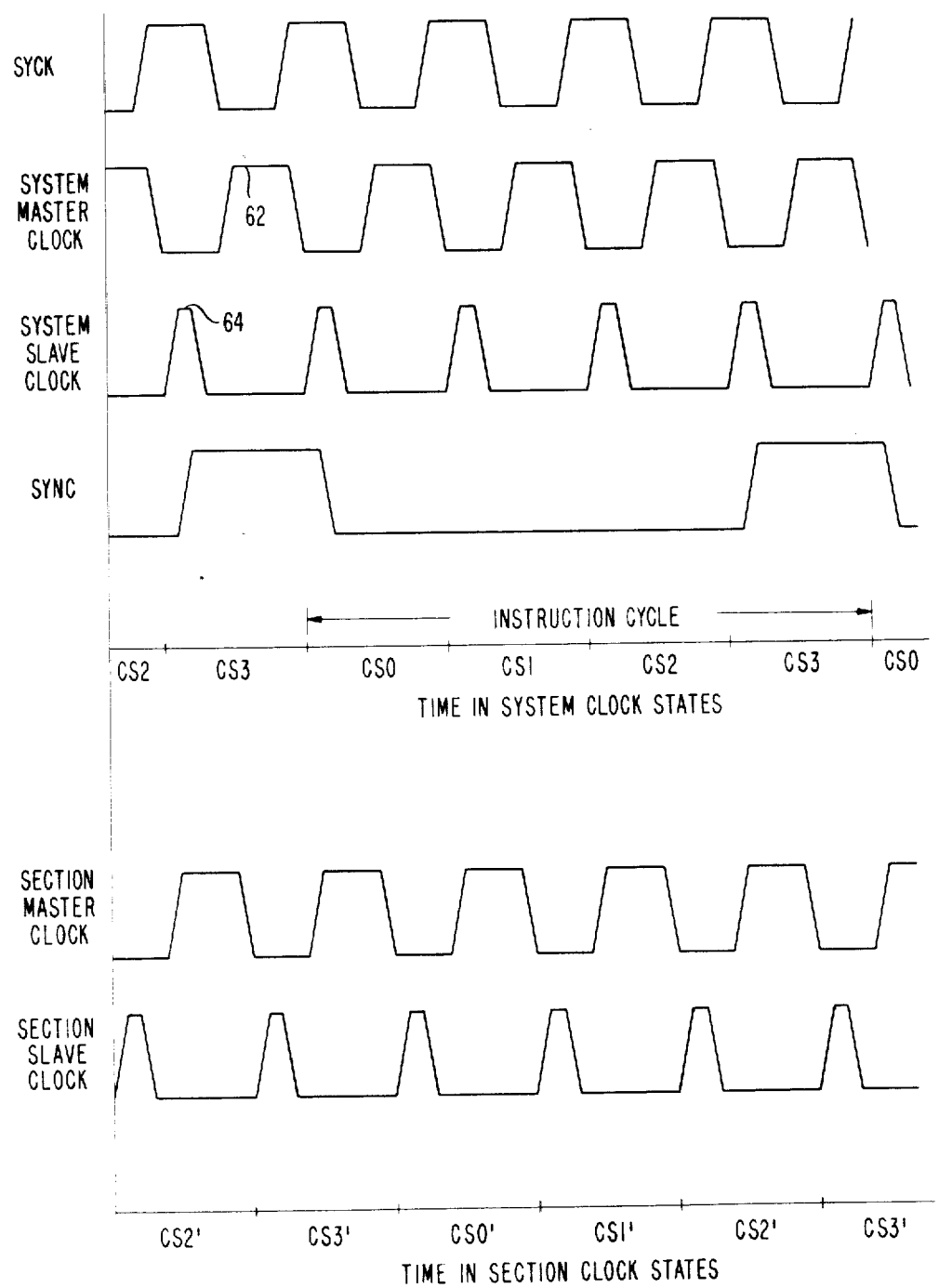
FIG. 6 is a timing diagram showing waveforms occurring during operation of the timing system and circuits, shown in FIGS. 1 through 5.

Referring now to FIG. 1, there is shown a block diagram of an arrangement for generating and distributing clock signals in a synchronous processing system having separate processing sections A and B. The processing sections A and B include processing circuits 10 and 11 arranged to process data simultaneously in synchronism with each other. Although not shown specifically in FIG. 1, other processing sections including processing circuits also working in synchronism with the circuits of processing sections A and B may be included in the system. Each processing section may do the same processing function as the others, or it may do a different processing function than the other processing sections. Each of the processing sections is electrically separated from the other sections except for interconnections, such as by way of a common data bus 15 and other buses 17 and 18, any of which may be long enough to cause substantial signal delays. A continuous sequence of system clock signals SYCK, as shown in FIG. 6, is provided by an oscillator, or central clock, circuit 20 and is transmitted over a system clock lead 21 and through inverting delay circuits 22 and 23, respectively, to separate section clock circuits A' and B'. Additionally, the continuous sequence of system clock signals SYCK is transmitted through the lead 21 to a synchronization clock circuit 24 which produces a synchronization pulse SYNC on a synchronization lead 45.

For purposes of illustration, the synchronization clock circuit 24 is a counter designed to repeatedly produce a pulse on the synchronization lead 45 for every fourth pulse of the continuous sequence of system clock signals SYCK.

Section clock circuits A' and B' are counter circuits, responsive to an inverted and delayed version of the continuous sequence of system clock signals SYCK, for stepping through a plurality of states, chosen for purposes of illustration to be four states, CS0, CS1, CS2, CS3. An output lead is shown for each of the four states of each of the section clock circuits A' and B'. A signal occurring on each lead goes to a high level for indicating that the counter is in the state associated with that lead. These leads and their associated signals, are designated S0, S1, S2 and S3 to relate to the states of the section clock circuits. They are generated as section clock signals for operating their associated section processing circuits. Other useful section clock signals may be generated from these signals.

Figure 2:
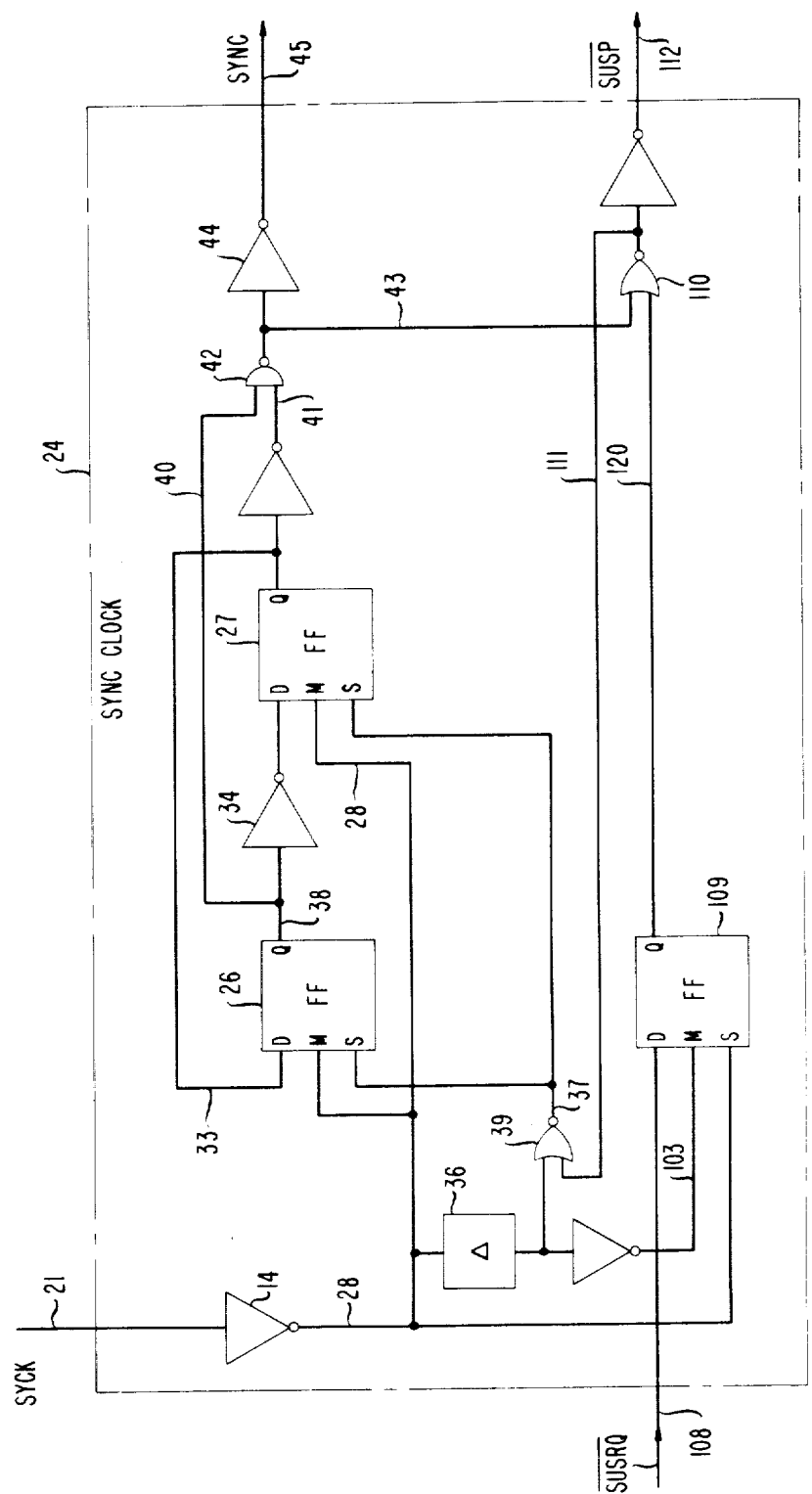
FIG. 2 is a logic schematic of a circuit for producing a synchronization clock signal.

Referring now to FIG. 2, there is shown a logic schematic of the synchronization clock circuit 24, which includes a pair of similar master-slave circuits 26 and 27 arranged as a two stage (or four-state) Grey Code Counter. Both of the master-slave circuits 26 and 27 are D-type storage registers.

Figure 3:
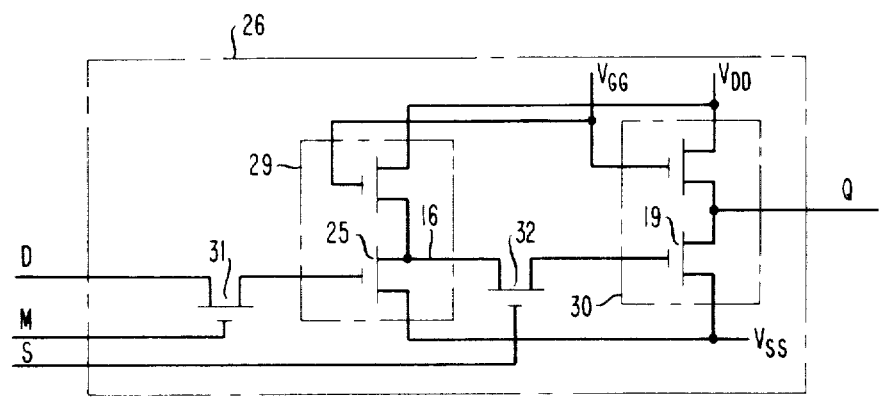
FIG. 3 is a schematic diagram of a master-slave circuit for the synchronization clock circuit of FIG. 2.

Referring now to FIG. 3, there is shown a two-phase dynamic logic circuit 26 which may be used for each of the master-slave circuits 26 and 27 in FIG. 2. Circuit 26 of FIG. 3 has an input master bistable section 29 and an output slave bistable section 30. The master and slave sections each include, an n-channel enhancement mode MOS inverter circuit having a driver device and a load device. A signal on an input terminal D of the circuit 26 is coupled through an MOS gate device 31 to the input of the master section 29 under control of system master clock signals, as shown in FIG. 6, which are applied through a master clock input terminal M to a gate electrode of the gate device 31.

As shown in FIG. 2, each pulse of the system clock signal SYCK on lead 21 is inverted by way of an inverter 14 onto a lead 28 as the system master clock signal for both of the master-slave circuits 26 and 27 of the synchronous clock circuit 24 and therefore for the circuit 26 of FIG. 3. In FIG. 2 the system master clock signal on the lead 28 also is applied to a slave clock input terminal S of a master-slave circuit 109, which is used for some suspend condition timing.

When the system master clock signal, a high level signal 62 as shown in FIG. 6, is applied to the master clock input terminal M in FIG. 3, the gate device 31 conducts and thereby couples the level of signal currently being applied to the input terminal D of the circuit 26 to the gate electrode of the driver device 25 of the master section 29 for determining the state of that master section. The state determined in the master section is inverted from the state of the input signal existing on the input terminal D. After the system master clock signal returns to a low level, the state of the master section is determined by charge stored in the capacitance of the gate electrode of the driver device 25. This state is indicated by the voltage level on the master section output lead 16, which interconnects the driver and load devices and which is connected to another gate device 32.

The state indicated at the output lead 16 of the master section 29 is coupled through the gate device 32 to the input of the slave section 30 under control of a system slave clock signal, as shown in FIG. 6, which is applied through a slave clock input terminal S to a gate electrode of the gate device 32. The system slave clock signal is produced in the circuit of FIG. 2 by applying the system master clock signal through a delay element 36 and a suspend system slave clock gate 39 to produce the system slave clock signal on a lead 37 and on the slave clock input terminals S of the circuits 26 and 27. The system slave clock signal is produced cyclically as long as the suspend signal on a lead 111 is held low. The delay element 36, delays clock pulses sufficiently long for the state of the master section to settle into its new state before the resulting slave clock signal occurs. The system slave clock signals are narrowed by providing in association with the gate 39 a well-known pulse narrowing circuit which is not shown. The system slave clock and the system master clock signals are out of phase with each other so that they are at their high levels at mutually exclusive times.

When the system slave clock signal 64, a high level signal, as shown in FIG. 6, is applied to the slave clock input terminal S in the circuit 26, the existing state of the master section 29 is coupled through the gate device 32 to the gate electrode of the driver device 19 of the slave section 30 thereby determining the state of that slave section. The state of the master section is inverted when it is applied to the input of the slave section. After the system slave clock signal of FIG. 6 returns to a low level, the state of the slave section 30 is determined by charge stored in the capacitance of the gate electrode of the driver device 19 of the slave section. This state of the slave section is considered to be the state of the circuit 26 and is indicated by a voltage level produced on an output lead Q of the circuit 26.

The circuit 26 is considered to operate dynamically because the states of the master and slave sections 29 and 30 are determined by stored charge, which can dissipate over an interval of time.

In FIG. 3, bias voltages $V_{GG}$, $V_{SS}$ and $V_{DD}$ supply bias, respectively, to the gate, source and drain terminals of the MOS devices shown therein.

Referring once again to FIG. 2, it is noted that there is a feedback arrangement. The output of the master-slave circuit 27 is fed back through a lead 33 to the input D of the master-slave circuit 26. The output Q of the master-slave circuit 26 is coupled through an inverter circuit 34 to the input D of the master-slave circuit 27. The system master clock signal on the lead 28 clocks the signal levels from the inputs D into the master sections of the circuits 26 and 27. Since the signal level residing on the input terminal D of the master-slave circuit 26 is fed back from the output Q of the circuit 27, the state of the slave section of the circuit 27 determines whether a "1" or a "0" is stored in the master section of the bistable circuit 26 as a result of the system master clock signal falling from its high level to zero. When the state of the master section of the master-slave circuit 26 is settled into its new state, an indication of that new state is applied to the input of the slave section of the master-slave circuit 26.

In response to the next subsequent system slave clock signal, the slave section of the master-slave circuit 26 is forced into the state caused by the output of the master section currently being applied through the gate device 32 to the input of the slave section. When the slave section settles into its new state, a signal, representing both the state of the slave section and the state of the master-slave circuit 26, is produced on its output terminal Q.

In FIG. 2 this signal, representing the state of the master-slave circuit 26, is applied over a lead 38 and through the inverter circuit 34 to the input terminal D of the master-slave circuit 27. The inverted state signal applied at the input terminal D of the circuit 27 determines the state of its master section upon occurrence of the next system master clock signal on the lead 28. The resulting state in the master section of the circuit 27 is transferred into the slave section thereof in response to the next system slave clock signal on the lead 37. A signal representing both the state of the slave section and the state of the master-slave circuit 27 is produced on the output terminal Q of the circuit 27.

Synchronization clock circuit 24 steps from its zero state CS0, wherein the slave sections of the circuits 26 and 27 both store zeros, through first, second and third Grey Code states and then the circuit 24 returns to its zero state CS0. The output signal from the output terminal Q of the master-slave circuit 26 and an inverted output signal from the output terminal Q of the master-slave circuit 27 are applied, respectively, by way of leads 40 and 41 to the inputs of a NAND gate 42. The signal, produced by the NAND gate 42 on a lead 43, is a high level signal except when the master-slave circuits 26 and 27 of the counter indicate that the counter is in its third state CS3 (i.e., the slave section of the circuit 26 is in its state 1 and the slave section of the circuit 27 is in its state 0). At that time, the signal on the lead 43 goes to a low level. An inverter 44 inverts the signal on the lead 43 to a high level synchronization signal SYNC that is produced on a lead 45.

Figure 4:
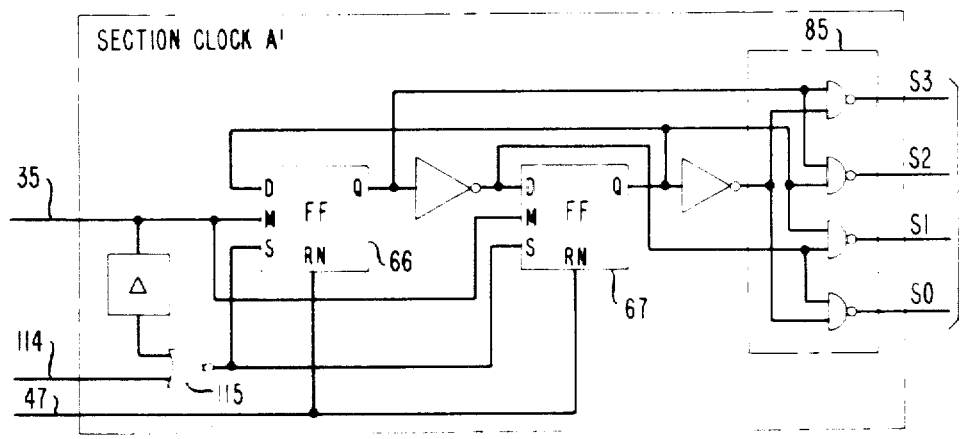
FIG. 4 is a logic schematic of a circuit for producing a section clock signal.

Referring now to FIG. 4, there is shown a logic schematic of the section clock circuit A' which is similar to the section clock circuit B' of FIG. 1 and to other section clock circuits not shown therein. Section clock circuit A' basically is a four-state Grey Code counter like the counter of the synchronization clock circuit 24 described previously. There are, however, some features provided in the section clock circuit A', which are added to those described with respect to the synchronization clock circuit 24.

As shown in FIGS. 1 and 4, the high level synchronization clock signal SYNC of FIG. 6 is applied by way of the lead 45, an inverting delay circuit 46 and a lead 47 to reset terminals RN of resettable master-slave circuits 66 and 67 in FIG. 4. The high level synchronization clock signal SYNC, which occurs once for every fourth system clock pulse SYCK, causes the state of the Grey Code counter in the section clock circuit A' of FIG. 4 to be reset to a predetermined counter state regardless of what state that counter is in when the high level of the synchronization clock signal SYNC occurs.

In FIG. 1, the inverting delay element 46 is interposed between the lead 45 and the lead 47 which is connected to the reset terminals RN of the resettable master-slave circuits 66 and 67, shown in FIG. 4. The symbol $\tau_A$ in the delay element 46 indicates that the delay element 46 provides a delay duration which assures that the reset signal, derived from the signal SYNC on the lead 45, arrives at the reset terminal RN of the section clock circuit A' concurrently with its arrival at similar reset terminals RN of the section clock circuit B' and other section clock circuits not shown in FIG. 1. Each section clock has a delay element interposed between the lead 45 and the reset terminal RN to compensate for different transmission delays from the synchronization clock circuit 24 to the reset terminals.

In FIG. 1, the inverting delay element 22 is interposed between the lead 21 and the lead 35 which is connected to the master trigger input terminals of the resettable master-slave circuits 66 and 67, shown in FIG. 4. The symbol $\tau_A$ in the inverting delay element 22 indicates that the delay element 22 provides a delay duration which assures that a section master clock signal, shown in FIG. 6 and derived from the system clock pulse SYCK on the lead 21, arrives at the master clock terminals M of the resettable master-slave circuits in the section clock circuit A' concurrently with its arrival at similar master clock terminals M in the section clock circuit B' and other section clock circuits, not shown in FIG. 1. Each section clock circuit has such an inverting delay element interposed between the lead 21 and the section clock circuit master clock input terminals M to compensate for different transmission delays from the central clock 20 to the section clock circuit master clock input terminals.

Figure 5:
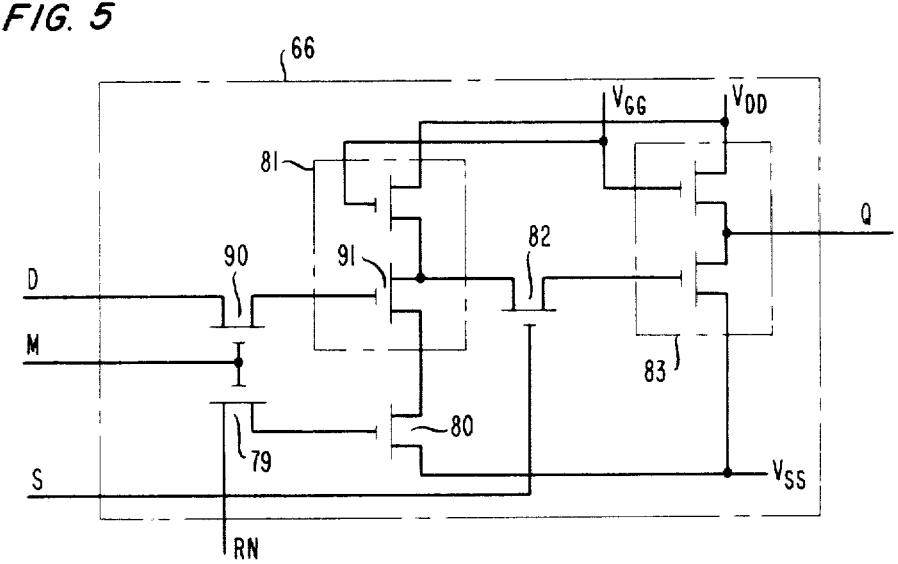
FIG. 5 is a schematic diagram of a resettable master-slave circuit for the section clock circuit of FIG. 4.

Referring now to FIG. 5, there is shown a circuit 66 which may be used for either of the resettable master-slave circuits 66 and 67, shown in FIG. 4. Circuit 66 is a D-type storage register similar to the circuit 26, shown in FIG. 3, except that the circuit 66 is resettable under certain conditions. With the synchronization signal SYNC being inverted onto the lead 47 of FIGS. 1 and 4, most of the time a high level signal is applied to the reset terminal RN of the circuit 66. Once during every fourth clock state, the inverted synchronization signal on the lead 47 goes low. When the section master clock signal applied to the master clock terminal M of FIG. 5 goes high while the high level signal is applied to the reset terminal RN, a gate device 79 couples the high level signal from the reset terminal RN to the gate electrode of a reset device 80 which is thereby enabled to conduct. While the reset device 80 is enabled to conduct, a master section 81 assumes a state determined by whatever input signal level is applied to the input terminal D and is coupled through a gate device 90 to a gate electrode of a driver device 91 of the master section 81. The input signal is inverted by the master section which produces a resulting inverted signal.

When a subsequent section slave clock signal shown in FIG. 6 occurs on the slave clock terminal S in FIG. 5, the state of the master section is coupled by way of a gate device 82 to the input of a slave section 83 for determining its state which is inverted from the state of the master section. In FIG. 5, the state of the circuit 66 is indicated by the level of the signal produced on the output terminal Q after the section slave clock pulse goes low.

An operational difference between the circuit 66 and the circuit 26 of FIG. 3 occurs during the one-out-of-four clock states when a low level reset signal is applied to the circuit 66 of FIG. 5 by way of the reset terminal RN. When the section master clock signal is at its high level while the reset signal is low, the gate device 79 couples the low level reset signal to the gate electrode of the reset device 80 which is biased thereby to cut off. As a result the state of the master section 81 is determined so that the master section produces a high level output regardless of the input signal applied to the input terminal D of FIG. 5. The following section slave clock signal enables the gate device 82 to couple the high level signal from the master section 81 to the gate electrode of the driver device in the slave section 83. As a result of the section slave clock signal and the high level signal from the master section 81, the slave section 83 assumes a state wherein it produces a low level signal on the output terminal Q of the circuit 66. This signal on the output terminal Q indicates both the state of the slave section 83 and the output of the entire resettable master-slave circuit 66.

As a result the section clock circuit A' is set to its third state CS3.

Referring now to FIG. 6, the series of waveforms represent the clock signals used within the timing system. As shown on the horizontal axis, time is presented in clock states and in instruction cycles. There are four system clock states CS0, CS1, CS2 and CS3 for each instruction cycle. The four system clock states are repeated during each instruction cycle.

Each section clock circuit of FIG. 1 is arranged to respond to its delayed system clock signal, such as the one applied to section clock A' by way of the lead 35. In response to those delayed system clock signals, the section clock circuits step through four section clock states CS0', CS1', CS2' and CS3', which are delayed from the system clock states. When the reset signal, i.e., the inverted and delayed synchronization signal, is applied, all of the section clock circuits are set to a common state which has been chosen to be the third section clock state CS3'.

In FIG. 6, the system clock states commence with the system clock state CS3 for convenience of explaining the overall operation of the timing system. It is noted that during the system clock state CS3 the synchronization signal SYNC on lead 45 goes to its high level. The reset signal on the lead 47 goes low for setting the master-slave circuits 66 and 67 in the counter of the section clock circuit of FIG. 4. This setting of the counter of the section clock circuit occurs in each of the section clock circuits assuring that the Grey Code counters in the section clock circuits A' and B' are in identical counter states at the end of the system clock state CS3.

The system clock signal SYCK, the system master clock signal, the system slave clock signal, the section master clock signal and the section slave clock signal are shown repeating four times during one instruction cycle. A series of four system master clock signals and a series of four system slave clock signals cause the synchronization clock circuit 24 of FIGS. 1 and 2 to step through the four states of the Grey Code. The fourth state is the system clock state CS3 wherein the section clock circuits A' and B' are set to their section clock state CS3' by the inverted synchronization signal on lead 47 of FIGS. 1 and 4. This setting of the section clock circuits to a common state once during each instruction cycle assures that the states of all of the section clocks concur and that the section processing circuits 10 and 11 operate synchronously.

Gate 42 of FIG. 2 is arranged to detect the system clock state CS3 of the synchronization clock circuit 24, and together with the inverter 44 produces on lead 45 the synchronization signal SYNC of FIG. 6.

Because of the synchronous operation of the section processing circuits 10 and 11 in FIG. 1, the result of the processing in each section is available for inputting to any other processing section for the next subsequent instruction cycle. Consequently, data being processed can be processed efficiently in a pipelined manner from processing section to processing section. The processing being performed in each processing section is kept in step with the processing of all other processing sections.

The four states of the counter of the section clock circuit A' of FIG. 4 are decoded by way of an output logic circuit 85 that generates a 1-out-of-4 group of section clock signals to indicate the state of the section clock circuit A'. Decoding is accomplished from the true and inverted signals representing the states of the master-slave circuits 66 and 67. The decoded states generate the section clock signals on output leads designated S0, S1, S2 and S3 in numerical agreement with the section clock states. Additional decoding circuits, which can be included within the section block circuits A' and B' and made responsive to the signals on the leads S0, S1, S2 and S3, may be either alike or different from each other. A wide variety of useful section clock signals for operating the processing circuits in the processor sections A and B, as shown in FIG. 1, may be generated from the 1-out-of-4 group of section clock signals and transmitted by the processing circuits.

Various types of data transfers are possible from a peripheral device to the processing circuits and vice versa. Transfers include both a buffered transfer into the processor and a buffered transfer out of the processor. These transfers are synchronized with the processing circuits 10 and 11 of FIG. 1 by suspending processing from time to time for servicing the data transfer operations. For purposes of illustration, the processing system of FIG. 1 is arranged for an input transfer from a peripheral device 101 by way of an external bus 116, an input buffer 118 and the data bus 15 to the processing circuits 10 or 11.

Processing of data originating from the peripheral device 101 can be synchronized readily by the timing system of FIG. 1. The processor control circuitry is prepared for synchronizing with this input transfer of data by a command signal which is a part of an instruction that is latched into a latching circuit 100, shown in FIG. 1. This command signal is applied to a synchronization register 102 which is shown both in FIG. 1 and in greater detail in FIG. 7. The synchronization register 102 includes circuitry for synchronizing the mentioned input transfer. It also includes circuitry for synchronizing various other types of transfers, but for the sake of brevity only the circuitry for the illustrative input transfer is described completely herein.

Figure 7:
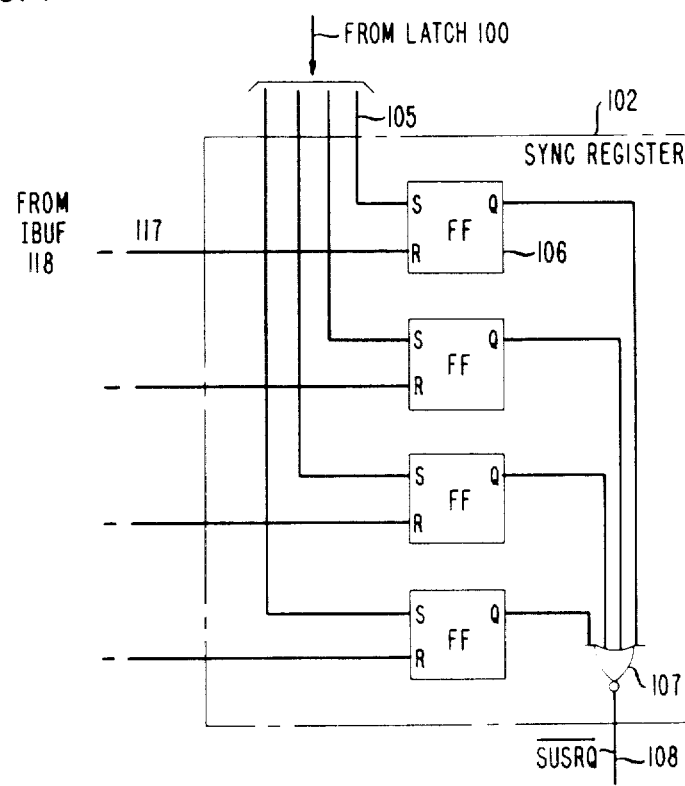
FIG. 7 is a logic schematic of a synchronization register circuit.

Referring now to FIG. 7, the command signal from the latching circuit 100 is applied by way of a lead 105 to a set terminal S of an RS flip-flop circuit 106 which is set thereby. Information, represented by the command signal on the lead 105, identifies a condition or an event, such as the input buffer 118 of FIG. 1 being full. After the flip-flop 106 in FIG. 7 is set, the command signal is terminated. A resulting high level output signal from an output terminal Q of the flip-flop 106 causes an output NOR gate 107 to produce a low level output signal $\overline{SUSRQ}$ on a lead 108. Other flip-flops of the syncrhonization register 102 remain reset and provide low level output signals from their output terminals Q.

Figure 8:
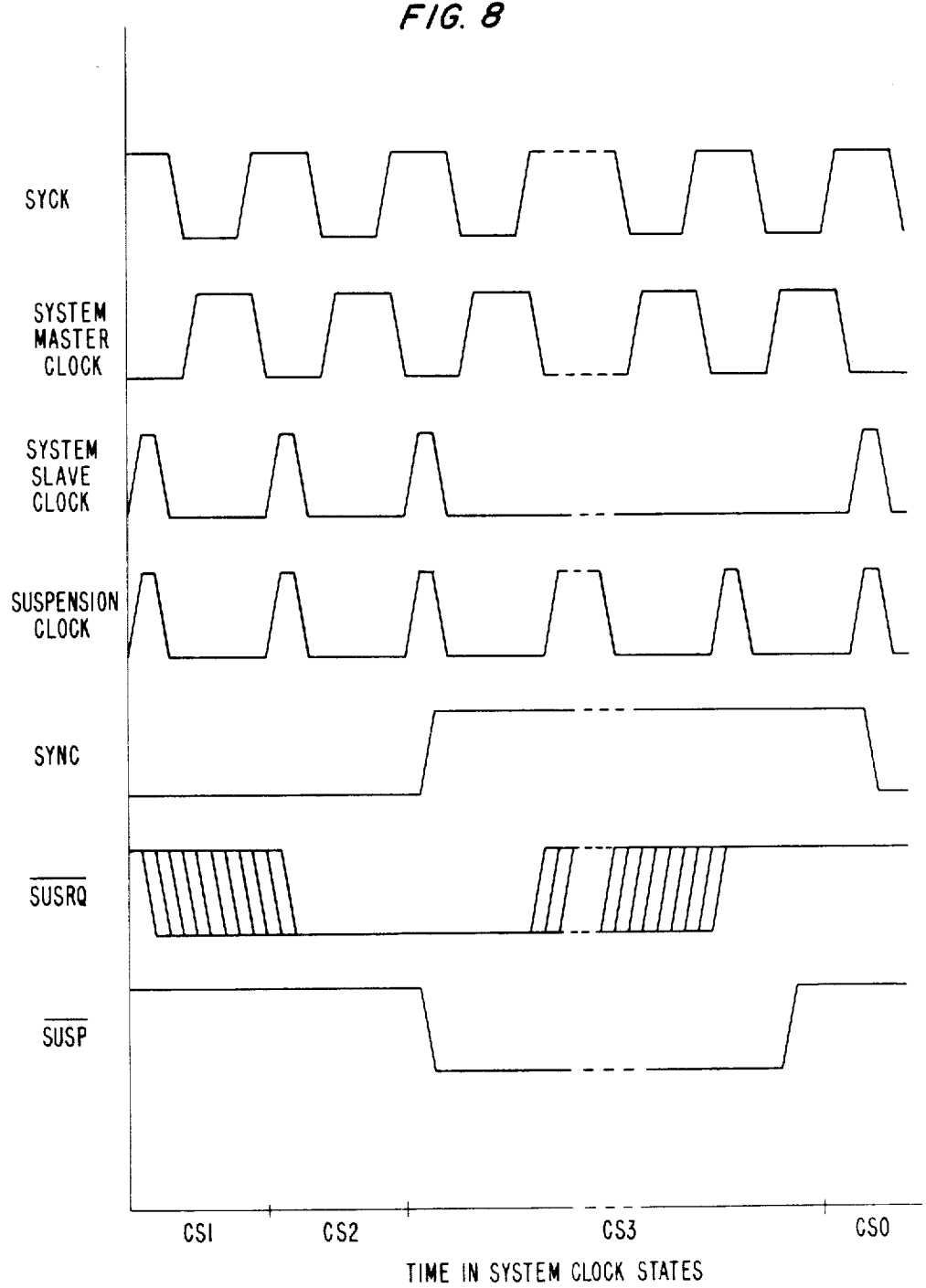
FIG. 8 is a timing diagram showing waveforms occurring during suspension of operation of the timing system and circuits, shown in FIGS. 1 through 5.

Referring also to FIG. 8, there are shown several waveforms that occur during a suspension of processing. During suspension many of the clock signals are interrupted. As shown in FIG. 8, however, the system clock signal SYCK and the system master clock signal are applied continuously during the suspension. Additionally a suspension clock signal, shown in FIG. 8 and occurring on a lead 103 in FIG. 2, is applied continuously for helping to retain control of the system during the suspension.

Since a request for suspension may occur at any time, its associated signal $\overline{SUSRQ}$ may go to its low level at any time during an instruction cycle, as shown by several alternative trailing edge lines in FIG. 8.

In response to the signal $\overline{SUSRQ}$ and the synchronization clock circuit stepping into its system clock state CS3, the processing system is put into its suspend state. A suspension signal is to be produced and distributed to all of the section clock circuits until the identified event occurs. In this case the identified event is the input buffer becoming full. As a result of the suspension signal, the section clock signals are to be suspended in their state CS3' until the input buffer is filled with data via the external data bus 116, as shown in FIG. 1.

As shown in FIGS. 1 and 2, the low level signal $\overline{SUSRQ}$ from the synchronization register 102 is applied through the lead 108 to a suspension request flip-flop 109 which is not set thereby. The flip-flop 109 applies a low level signal over a lead 120 to an input of a suspend processing gate 110, which produces a high level output signal on a lead 111 in response to the low level signal on the lead 120 and another low level signal on the lead 43. This low level signal on the lead 43 represents that the synchronization clock circuit 24 has stepped into system clock state CS3.

The high level signal produced on the lead 111 is inverted to the low level signal $\overline{SUSP}$, shown in FIG. 8, is produced on lead 112 and is transmitted through an inverting delay element 113 to a lead 114.

The gates 42 and 110 are arranged to initiate the low level suspend signal $\overline{SUSP}$ on lead 112 only at the beginning of the system clock state CS3. Concurrently the signal SYNC on the lead 45 of FIG. 2 goes to its high level, as shown in FIG. 8. As shown in FIGS. 1 and 4, the high level signal on the lead 114 is applied to a suspend section slave clock gate 115 in the section clock circuit A'.

As previously mentioned, the system clock signal SYCK on the lead 21 and the system master clock signal on the lead 35 are continued during suspension. Other clock signals are disabled for the duration of the suspend condition. The high level signal on the lead 111 of FIG. 2 is applied to the suspend system slave clock gate 39 which is disabled thereby from transmitting system slave clock signals for the duration of the suspension, as shown in FIG. 8. This disabling of the system slave clock signal stops the stepping of the synchronization clock circuit in the system clock state CS3 while the suspension lasts.

Also the resulting high level signal on the lead 114 of FIGS. 1 and 4 disables the suspend section slave clock gate 115 of FIG. 4 from transmitting section slave clock signals for the duration of the suspension.

When the data has been transferred from the peripheral device to the input buffer 118 and is ready for transmission over the data bus 15, the data waits in the input buffer 118 for the timing system to initiate the transfer of the data through the data bus 15 to one of the processing circuits. The input buffer 118 includes both a data register and logic circuitry for generating, on a lead 117, a signal indicating that the input buffer 118 has been filled.

With the transfer into the input buffer 118 occurring at some time while the flip-flop 106 of FIG. 7 remains set, a condition fulfilled, or event occurred, signal is applied from the logic circuitry of the input buffer 118 by way of the lead 117 to the synchronization register 102. For the example being presented, this high level condition fulfilled signal is applied by the input buffer circuitry 118 for representing that the input buffer is full. In the circuit of FIG. 7, the condition fulfilled signal resets the flip-flop 106 causing the sychronization gate 107 to terminate the low level suspend request signal $\overline{SUSRQ}$ and produce a high level signal on the lead 108 indicating that the input buffer is full. This high level signal on the lead 108 may occur at any time during suspension, as shown by the several alternative leading edge lines in FIG. 8.

As a result of the high level signal on the lead 108, the suspend request flip-flop 109 in FIG. 2 is set so that it produces a high level signal at its output Q. This high level signal occurs on the lead 120 and is applied in FIG. 2 to the suspend processing gate 110, which produces a low level signal. Its inverted signal, that occurs on the lead 112, is applied through the inverting delay circuit 113 and the lead 114 to the section clock circuit A'. Termination of the low level signal $\overline{SUSP}$ on the lead 112 follows the rising edge of the system master clock signal for the clock cycle after the suspend request signal $\overline{SUSRQ}$ goes high, as shown in FIG. 8, and the resulting high level is applied to the suspend section slave clock gate 115, shown in FIG. 4. The concurrent low level signal on the lead 114 enables the gate 115 in the section clock A' of FIG. 4 for transmitting the section slave clock signals to the resettable master-slave circuits 66 and 67. Occurrence of the section slave clock signals enables the section clock circuits A' and B' to step out of their state CS3' into their state CS0' and other subsequent states. As they step through section clock states CS0', CS1', CS2' and CS3', they generate the multiple state section clock signals S0, S1, S2 and S3. From the section clock signals S0, S1, S2 and S3 and other clock signals derived therefrom, data processing is reactivated.

The data stored in the input buffer 118 is transferred subsequently to one of the processing circuits 10 or 11, in accordance with the machine instructions.

The foregoing describes an illustrative embodiment of the invention. The described arrangement together with other arrangements within the skill of the art are considered to be within the scope of the invention.

What is claimed is:

1. A timing system for distributing clock signals in a synchronous processing system having plural processing sections (A,B), the timing system includes a central clock circuit (20) for producing a continuous sequence of system clock signals (SYCK); the timing system BEING CHARACTERIZED BY:
    a plurality of section clock circuits (A',B'), each section clock circuit being located in and associated with a different one of the processing sections of the processing system;
    means for transmitting the continuous sequence of system clock signals to the section clock circuits as section master clock signals;
    each section clock circuit being arranged to respond to the section master clock signals applied thereto for stepping through a plurality of states (CS0', CS1', CS2', CS3') including a state (CS3') common to the plurality of section clock circuits;
    in response to the plurality of states, each section clock circuit generates section clock signals (S0, S1, S2, S3) for its associated processing section; and
    an arrangement (24), repeatedly responsive to the continuous sequence of the system clock signals, for producing and transmitting to the plurality of section clock circuits synchronization signals (SYNC) that routinely set the plurality of section clock circuits to the common state.

2. A circuit arrangement for producing clock signals including
    a section clock circuit arranged for stepping through plural states, including a common state, and generating associated section clock signals;
    a central clock circuit for providing a continuous sequence of system clock signals;
    means for transmitting the continuous sequence of system clock signals to the section clock circuit for controlling the stepping through the plural states and thereby the generation of the section clock signals;
    means, responsive to a command signal identifying a selected event, for producing a suspension signal and distributing it to the section clock circuit;
    gate means, included in the section clock circuit and responsive to the sequence of system clock signals and the suspension signal, for disabling the generation of the section clock signals by disabling the stepping through the states when the section clock steps into its common state; and
    means for applying a signal, representing the occurrence of the selected event, to the producing means for terminating the suspension signal and thereby enabling the stepping of the section clock circuit through the plural states and the generation of the section clock signals.

3. A circuit arrangement for producing and distributing clock signals including plural section clock circuits, each section clock circuit being arranged for stepping through plural states, including a common state, and generating associated clock signals synchronized with section clock signals being generated by others of the section clock circuits;

a central clock circuit for providing a continuous sequence of system clock signals;

means for transmitting the continuous sequence of system clock signals to the plural section clock circuits for controlling the stepping through the plural states and thereby the generation of the section clock signals;

means, responsive to a command signal identifying a selected event, for producing a suspension signal and distributing it to the section clock circuits;

gate means, included in the section clock circuits and responsive to the sequence of system clock signals and the suspension signal, for disabling the stepping through the states when the section clock circuits step into the common state and therefore for disabling the generation of the section clock signals; and means for applying a signal, representing the occurrence of the selected event, to the producing means for terminating the suspension signal and thereby enabling both the stepping of the section clock circuits through the plural states and the generation of the section clock signals.

4. A circuit arrangement for producing and distributing clock signals in accordance with claim 3 and further including each section clock circuit being arranged to step through the common state; and an arrangement, responsive to the sequence of system clock signals, for furnishing and transmitting to the plurality of section clock circuits a repeated synchronization signal that routinely sets the plurality of section clock circuits to the common state, the arrangement being further responsive to the suspension signal and the synchronization signal for insuring that synchronization among the section clock circuits is maintained throughout any interval during which the suspension signal is produced.

* * * * *